US012580634B2

(12) United States Patent
Prasad et al.

(10) Patent No.: US 12,580,634 B2
(45) Date of Patent: Mar. 17, 2026

(54) REFLECT BEAM SELECTION FOR POWER ANGLE SPECTRUM

(71) Applicant: QUALCOMM Incorporated, San Diego, CA (US)

(72) Inventors: Narayan Prasad, Westfield, NJ (US); Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 18/172,838

(22) Filed: Feb. 22, 2023

(65) Prior Publication Data

US 2024/0283524 A1     Aug. 22, 2024

(51) Int. Cl.
*H04B 7/145*        (2006.01)
*H04W 24/02*        (2009.01)

(52) U.S. Cl.
CPC ............ *H04B 7/145* (2013.01); *H04W 24/02* (2013.01)

(58) Field of Classification Search
CPC .. H04B 7/145; H04B 7/0695; H04B 7/04013; H04W 24/02
See application file for complete search history.

(56) References Cited

U.S. PATENT DOCUMENTS

| | | | |
|---|---|---|---|
| 2023/0074103 A1 | 3/2023 | Liu et al. | |
| 2023/0086903 A1* | 3/2023 | Khojastepour | ........... G01S 3/14 342/201 |
| 2024/0031823 A1* | 1/2024 | Duan | .................... G01S 13/765 |
| 2024/0048188 A1* | 2/2024 | Elshafie | ............. H04B 7/04026 |
| 2024/0089744 A1 | 3/2024 | Fujishiro et al. | |
| 2024/0405807 A1* | 12/2024 | Haija | ................. H04B 7/04013 |

FOREIGN PATENT DOCUMENTS

| | | |
|---|---|---|
| KR | 20220150310 A | 11/2022 |
| WO | WO-2022146830 A2 | 7/2022 |
| WO | WO-2022249820 A1 | 12/2022 |

OTHER PUBLICATIONS

International Search Report and Written Opinion—PCT/US2024/011754—ISA/EPO—Apr. 25, 2024.

* cited by examiner

*Primary Examiner* — Afshawn M Towfighi
(74) *Attorney, Agent, or Firm* — Harrity & Harrity, LLP

(57)        ABSTRACT

Various aspects of the present disclosure generally relate to wireless communication. In some aspects, a beam reflecting device may receive target reflection angle information that indicates a target reflection angle range for reflect beams. The beam reflecting device may select one or more reflect beams based at least in part on the target reflection angle information. The beam reflecting device may transmit reflected power angle spectrum information that indicates the one or more reflect beams. Numerous other aspects are described.

30 Claims, 13 Drawing Sheets

910  Receive target reflection angle information that indicates a target reflection angle range for reflect beams 920  Select one or more reflect beams based at least in part on the target reflection angle information 930  Transmit reflected power angle spectrum (RPAS) information that indicates the one or more reflect beams

900

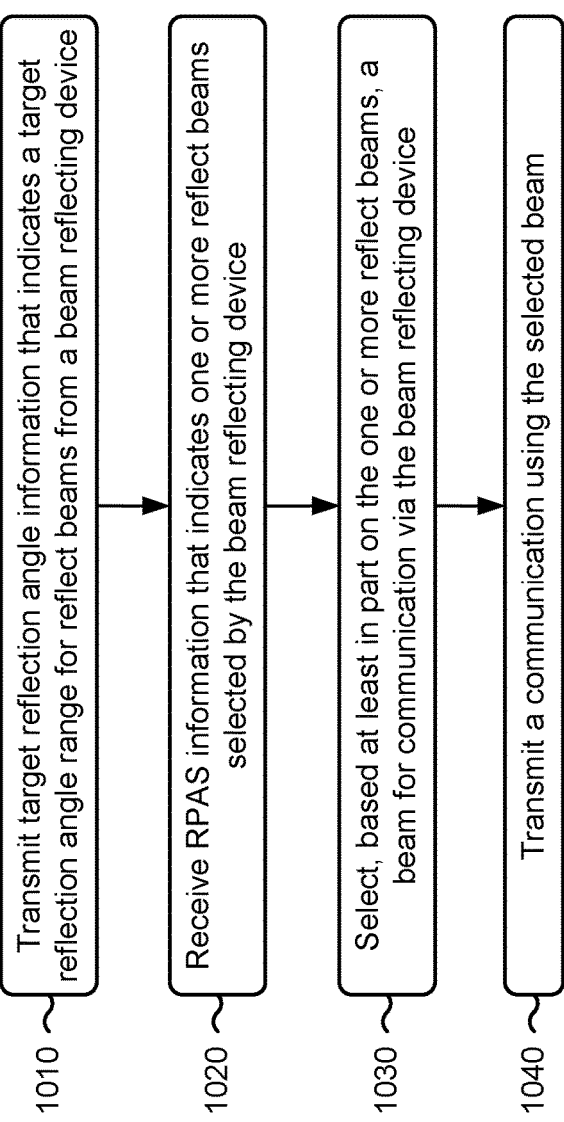

Transmit target reflection angle information that indicates a target reflection angle range for reflect beams from a beam reflecting device Receive RPAS information that indicates one or more reflect beams selected by the beam reflecting device Select, based at least in part on the one or more reflect beams, a beam for communication via the beam reflecting device Transmit a communication using the selected beam

REFLECT BEAM SELECTION FOR POWER ANGLE SPECTRUM

FIELD OF THE DISCLOSURE

Aspects of the present disclosure generally relate to wireless communication and to techniques and apparatuses for selecting a reflect beam for a power angle spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a beam reflecting device. The method may include receiving target reflection angle information that indicates a target reflection angle range for reflect beams. The method may include selecting one or more reflect beams based at least in part on the target reflection angle information. The method may include transmitting reflected power angle spectrum (RPAS) information that indicates the one or more reflect beams.

Some aspects described herein relate to a method of wireless communication performed by a transmitting device. The method may include transmitting target reflection angle information that indicates a target reflection angle range for reflect beams from a beam reflecting device. The method may include receiving RPAS information that indicates one or more reflect beams selected by the beam reflecting device. The method may include selecting, based at least in part on the one or more reflect beams, a beam for communication via the beam reflecting device. The method may include transmitting a communication using the selected beam.

Some aspects described herein relate to a beam reflecting device for wireless communication. The beam reflecting device may include a memory and one or more processors coupled to the memory. The one or more processors may be configured to receive target reflection angle information that indicates a target reflection angle range for reflect beams. The one or more processors may be configured to select one or more reflect beams based at least in part on the target reflection angle information. The one or more processors may be configured to transmit RPAS information that indicates the one or more reflect beams.

Some aspects described herein relate to a transmitting device for wireless communication. The transmitting device may include a memory and one or more processors coupled to the memory. The one or more processors may be configured to transmit target reflection angle information that indicates a target reflection angle range for reflect beams from a beam reflecting device. The one or more processors may be configured to receive RPAS information that indicates one or more reflect beams selected by the beam reflecting device. The one or more processors may be configured to select, based at least in part on the one or more reflect beams, a beam for communication via the beam reflecting device. The one or more processors may be configured to transmit a communication using the selected beam.

Some aspects described herein relate to a non-transitory computer-readable medium that stores a set of instructions for wireless communication by a beam reflecting device. The set of instructions, when executed by one or more processors of the beam reflecting device, may cause the beam reflecting device to receive target reflection angle information that indicates a target reflection angle range for reflect beams. The set of instructions, when executed by one or more processors of the beam reflecting device, may cause the beam reflecting device to select one or more reflect beams based at least in part on the target reflection angle information. The set of instructions, when executed by one or more processors of the beam reflecting device, may cause the beam reflecting device to transmit RPAS information that indicates the one or more reflect beams.

Some aspects described herein relate to a non-transitory computer-readable medium that stores a set of instructions for wireless communication by a transmitting device. The set of instructions, when executed by one or more processors of the transmitting device, may cause the transmitting device to transmit target reflection angle information that indicates a target reflection angle range for reflect beams from a beam reflecting device. The set of instructions, when executed by one or more processors of the transmitting device, may cause the transmitting device to receive RPAS information that indicates one or more reflect beams selected by the beam reflecting device. The set of instructions, when executed by one or more processors of the transmitting device, may cause the transmitting device to select, based at least in part on the one or more reflect beams, a beam for communication via the beam reflecting device. The set of instructions, when executed by one or more processors of the transmitting device, may cause the transmitting device to transmit a communication using the selected beam.

Some aspects described herein relate to an apparatus for wireless communication. The apparatus may include means for receiving target reflection angle information that indicates a target reflection angle range for reflect beams. The apparatus may include means for selecting one or more reflect beams based at least in part on the target reflection angle information. The apparatus may include means for transmitting RPAS information that indicates the one or more reflect beams.

Some aspects described herein relate to an apparatus for wireless communication. The apparatus may include means for transmitting target reflection angle information that indicates a target reflection angle range for reflect beams from a beam reflecting device. The apparatus may include means for receiving RPAS information that indicates one or more reflect beams selected by the beam reflecting device. The apparatus may include means for selecting, based at least in part on the one or more reflect beams, a beam for communication via the beam reflecting device. The apparatus may include means for transmitting a communication using the selected beam.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is a diagram illustrating an example process performed, for example, by a transmitting device, in accordance with the present disclosure.

DETAILED DESCRIPTION

Figure 1:
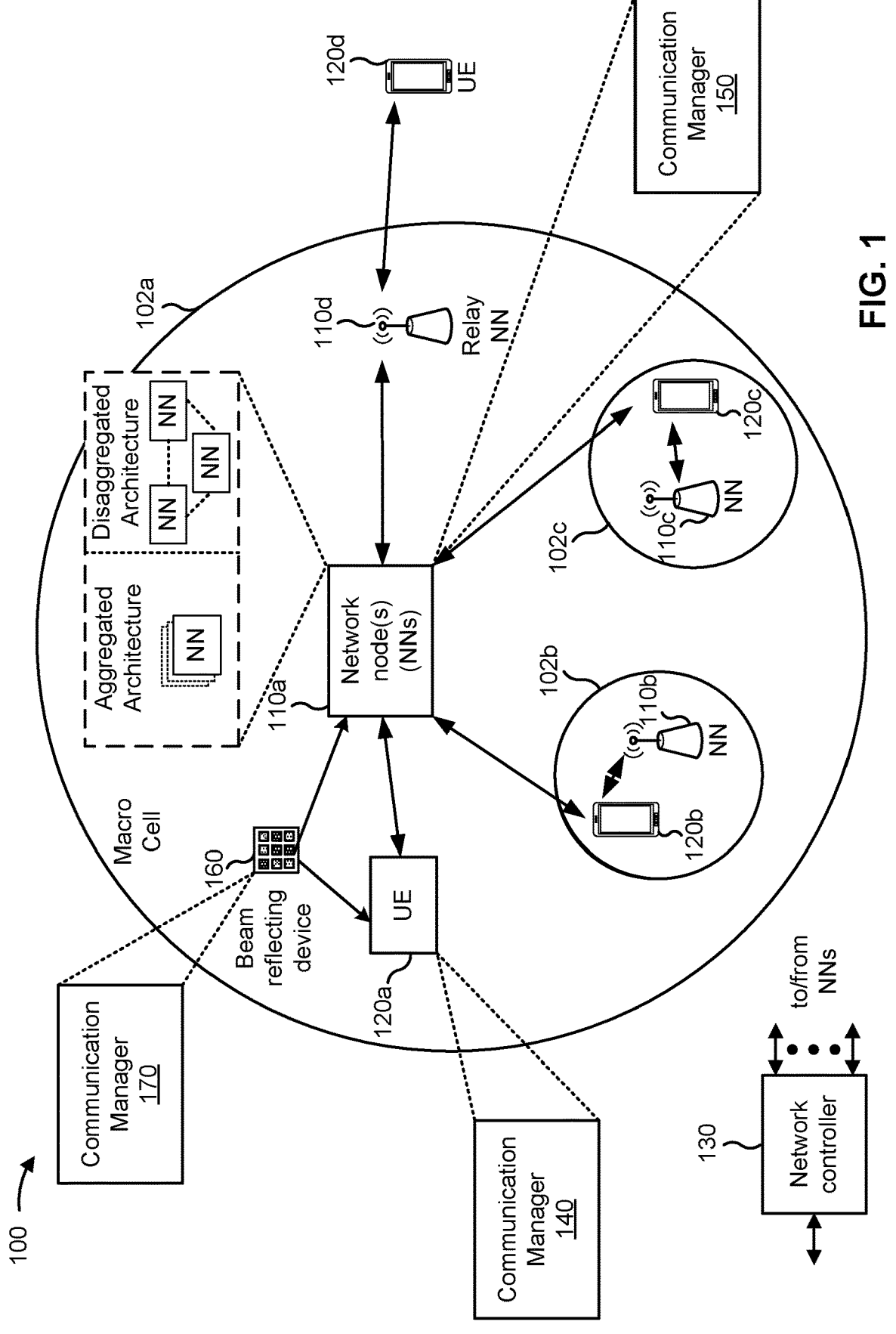
FIG. 1 is a diagram illustrating an example of a wireless network, in accordance with the present disclosure.

A transmitting device may transmit a signal that is reflected by a beam reflecting device to a receiving device. The beam reflecting device may be a reconfigurable intelligent surface (RIS) and have an array of passive and reconfigurable reflecting elements that can boost coverage and spectral efficiency at a low deployment cost. The reconfigurability of a RIS my enable a transmitting device, such as a gNB (or UE), to realize multiple anomalous reflections, which are reflections that would have altered reflection angles (e.g., violate Snell's law). Each reflection may be specified by a target incident direction and a reflected direction. The ability to select multiple anomalous reflections may enable the gNB to have more options or more flexibility in UE selection and may enhance an end-to-end channel to the UEs.

Reconfiguring a RIS can involve multi-state tunable electronic components (e.g., p-layer, intrinsic layer, n-layer (PIN) diodes, varactors), and the nature of these components determines the quality of a realized reflected beam for a given intended anomalous reflection. The quality can be indicated via attributes such as the gain in a desired direction, a main lobe width, and a maximal side lobe level. Since the tunable components have a frequency dependent response, the quality of each reflected beam varies with the frequency.

According to various aspects described herein, a transmitting device (e.g., a gNB, a UE) that controls a beam reflecting device (e.g., a RIS) may receive information from the RIS about a set of reflect beams that the RIS can realize. The transmitting device may become aware of the set of reflect beams without the RIS revealing specific RIS implementations (e.g., PIN-diode based, varactor diode based, with/without per element control). For example, the transmitting device may transmit target reflection angle information that indicates a target reflection angle range for reflect beams. The RIS may select one or more reflect beams based at least in part on the target reflection angle information. The RIS may transmit reflected power angle spectrum (RPAS) information to the transmitting device that indicates the one or more reflect beams (from a target incident direction to a target reflect direction) that are available for use by the transmitting device. The transmitting device may select a beam for a communication from the one or more reflect beams. As a result, beam resources are allocated more efficiently because the transmitting device is informed about the set of realizable RIS reflect beams and associated attributes. This efficiency conserves power, processing resources, and signaling resources.

Various aspects of this disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, and UE 120d), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Wireless network 100 shows a first device (e.g., UE 120a, network node 110) that may communicate with a second device (e.g., network node 110, UE 120a) directly or by reflecting signals via a beam reflecting device 160 (e.g., a RIS). The first device may be a transmitting device (e.g., network node 110, UE 120) and the second device may be a receiving device (e.g., UE 120, network node 110), because the transmitting device is transmitting a signal to the receiving device. This may be at the request of a network entity.

In some aspects, a beam reflecting device (e.g., beam reflecting device 160) may include a communication manager 170. As described in more detail elsewhere herein, the communication manager 170 may receive target reflection angle information that indicates a target reflection angle range for reflect beams. The communication manager 170 may select one or more reflect beams based at least in part on the target reflection angle information. The communication manager 170 may transmit RPAS information that indicates the one or more reflect beams. Additionally, or alternatively, the communication manager 170 may perform one or more other operations described herein.

In some aspects, a transmitting device (e.g., UE 120, network node 110) may include a communication manager 140 or 150. As described in more detail elsewhere herein, the communication manager 140 or 150 may transmit target reflection angle information that indicates a target reflection angle range for reflect beams from a beam reflecting device. The communication manager 140 or 150 may receive RPAS information that indicates one or more reflect beams selected by the beam reflecting device. The communication manager 140 or 150 may select, based at least in part on the one or more reflect beams, a beam for communication via the beam reflecting device. The communication manager 140 or 150 may transmit a communication using the selected beam. Additionally, or alternatively, the communication manager 140 or 150 may perform one or more other operations described herein.

As indicated above, FIG. 1 is provided as an example. Other examples may differ from what is described with regard to FIG. 1.

Figure 2:
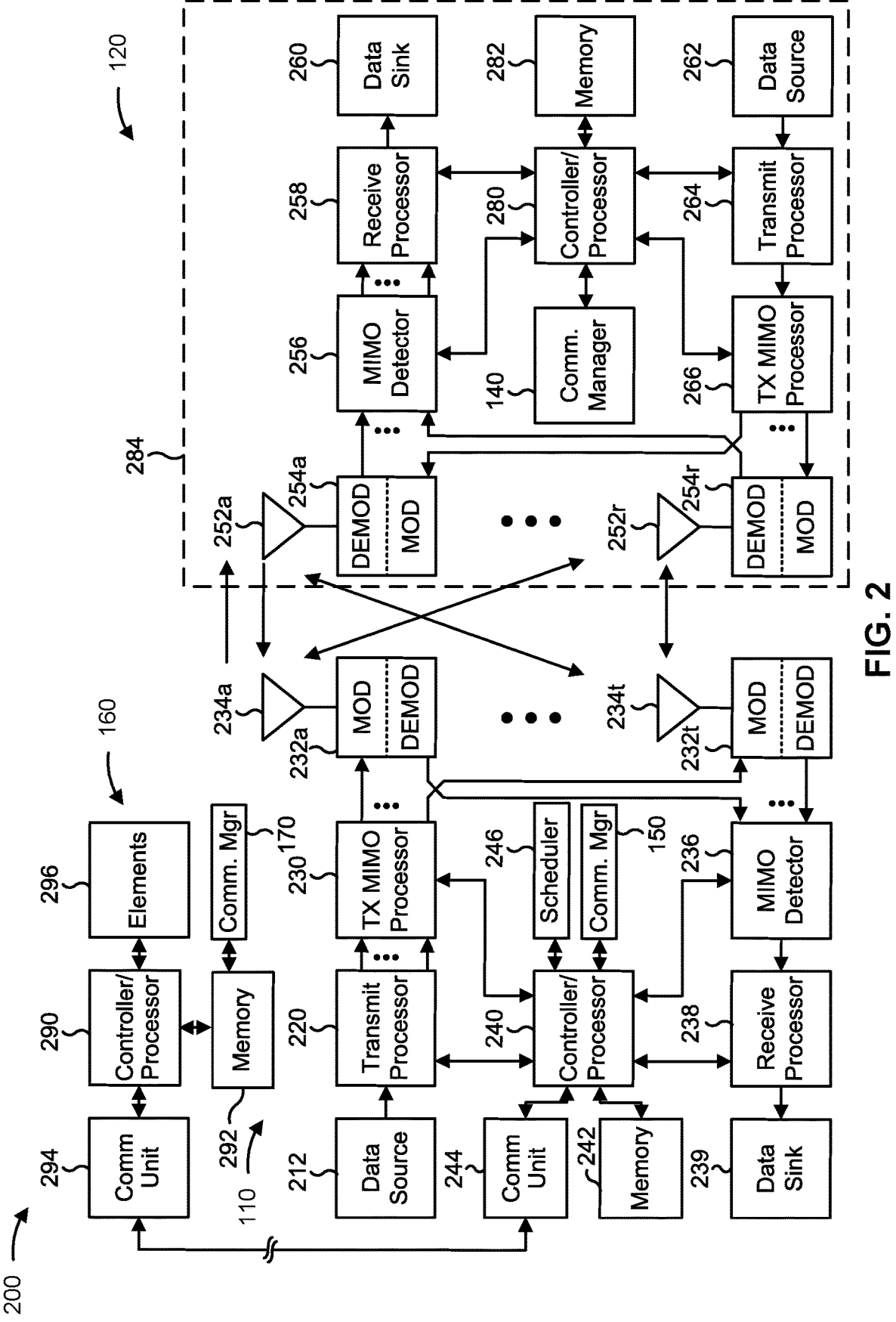
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and May provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., Toutput symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

The beam reflecting device 160 may include communication unit 294, controller/processor 290, memory 292, and surface elements 296. The controller/processor 290 may control a configuration (e.g., reflective direction) of the surface elements 296 by applying voltage to specific elements of the surface elements 296. The beam reflecting device 160 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

A controller/processor of a network entity (e.g., controller/processor 240 of the network node 110), the controller/processor 280 of the UE 120, the controller/processor 290 of the beam reflecting device 160, and/or any other component(s) of FIG. 2 may perform one or more techniques associated with selecting a reflect beam for a power angle spectrum, as described in more detail elsewhere herein. In some aspects, the transmitting device described herein is the network node 110, is included in the network node 110, or includes one or more components of the network node 110 shown in FIG. 2. In some aspects, the transmitting device described herein is the UE 120, is included in the UE 120, or includes one or more components of the UE 120 shown in FIG. 2. For example, the controller/processor 240 of the network node 110, the controller/processor 280 of the UE 120, controller/processor 290 of the beam reflecting device 160, and/or any other component(s) of FIG. 2 may perform or direct operations of, for example, process 900 of FIG. 9, process 1000 of FIG. 10, and/or other processes as described herein. The memory 242, the memory 282, and the memory 292 may store data and program codes for the network node 110, the UE 120, and the beam reflecting device 160, respectively. In some examples, the memory 242, the memory 282, and the memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110, the UE 120 and/or the beam reflecting device 160, may cause the one or more processors, the UE 120, the network node 110, and/or the beam reflecting device 160, to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a beam reflecting device (e.g., beam reflecting device 160) includes means for receiving target reflection angle information that indicates a target reflection angle range for reflect beams; means for selecting one or more reflect beams based at least in part on the target reflection angle information; and/or means for transmitting RPAS information that indicates the one or more reflect beams. In some aspects, the means for the beam reflecting device to perform operations described herein may include, for example, one or more of communication manager 170, communication unit 294, controller/processor 290, memory 292, or elements 296.

In some aspects, a transmitting device (e.g., UE 120, network node 110) includes means for transmitting target reflection angle information that indicates a target reflection angle range for reflect beams from a beam reflecting device; means for receiving RPAS information that indicates one or more reflect beams selected by the beam reflecting device; means for selecting, based at least in part on the one or more reflect beams, a beam for communication via the beam reflecting device; and/or means for transmitting a communication using the selected beam. In some aspects, the means for the transmitting device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the transmitting device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
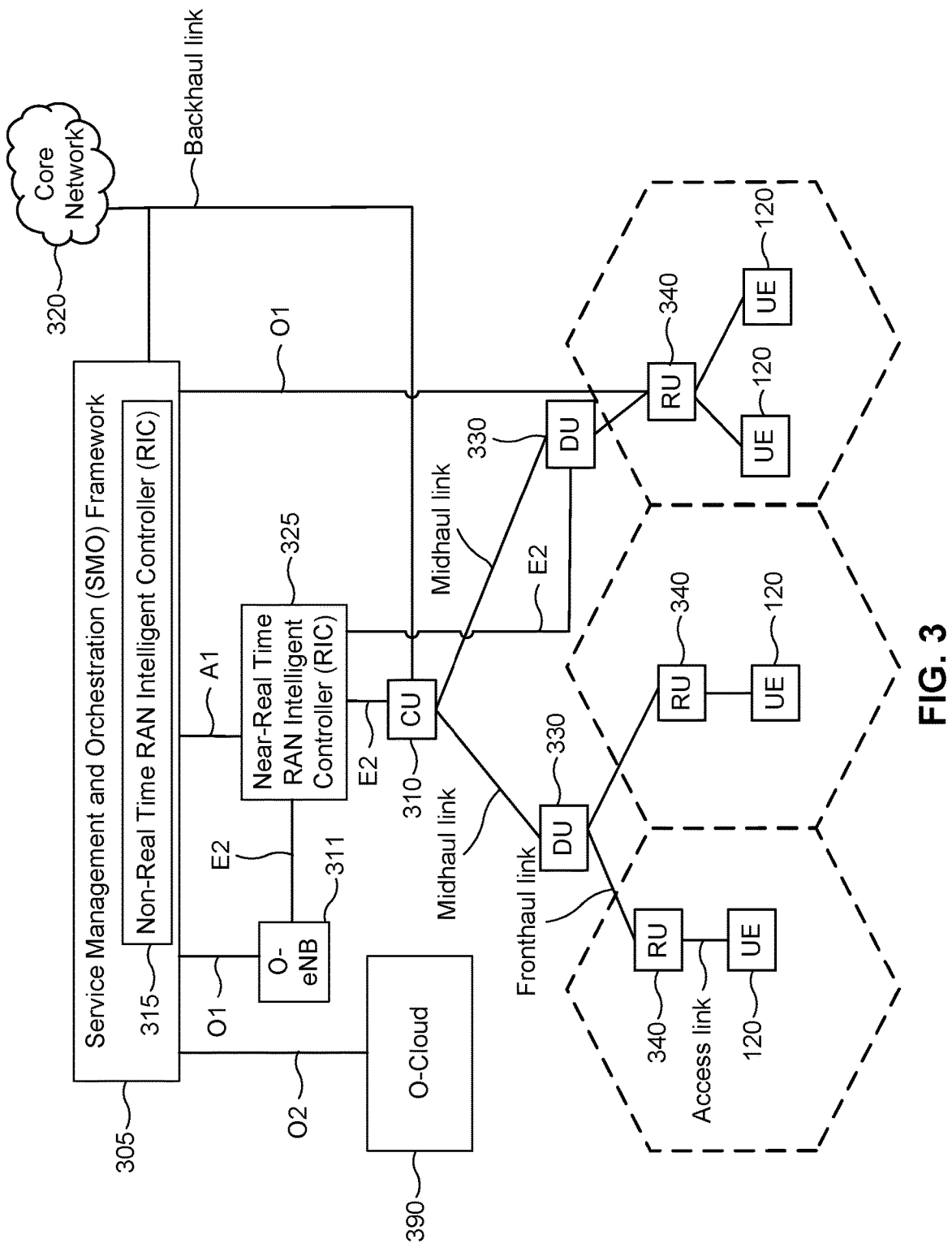
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
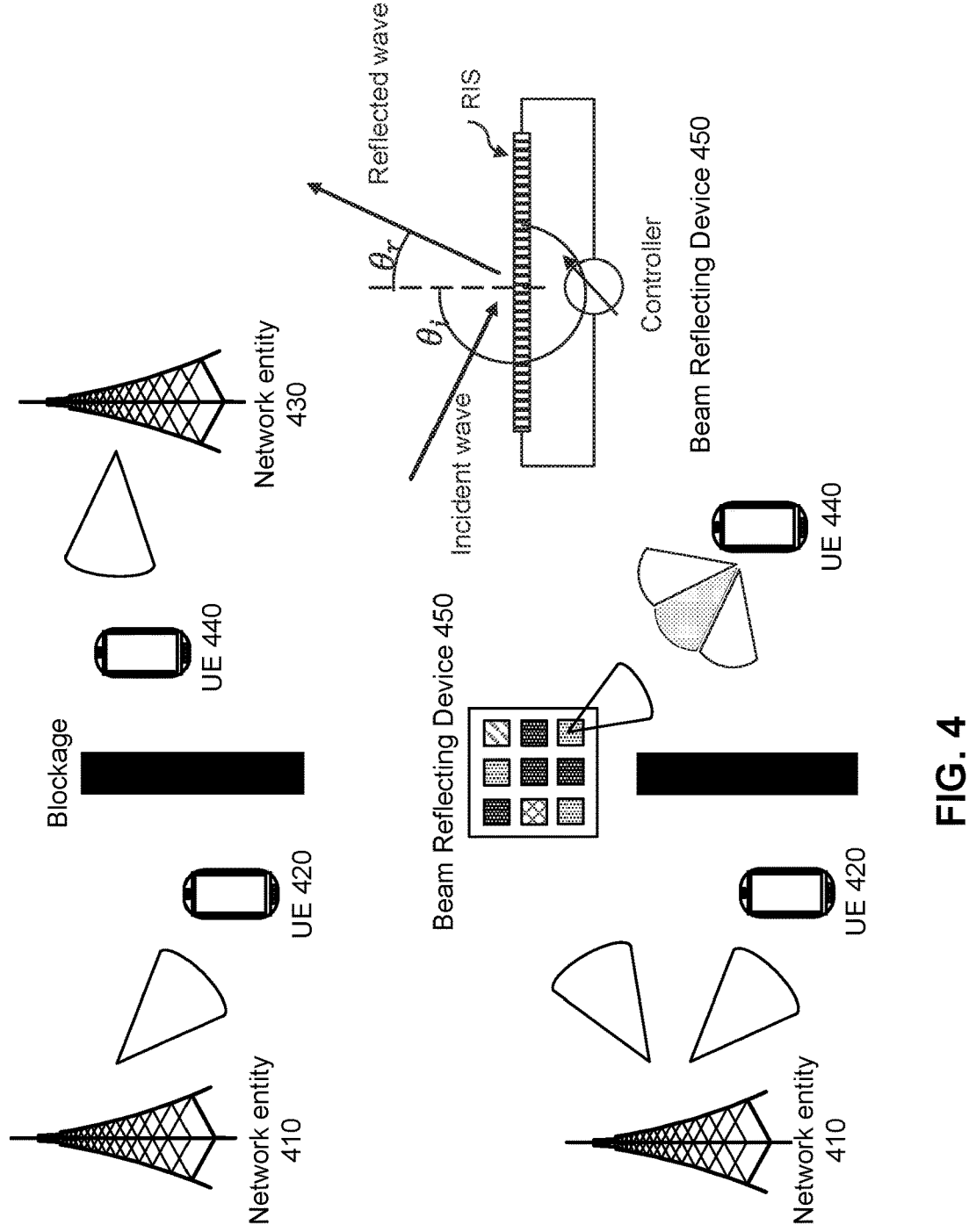
FIG. 4 is a diagram illustrating an example of using a beam reflecting device, in accordance with the present disclosure.

FIG. 4 is a diagram illustrating an example 400 of using a beam reflecting device, in accordance with the present disclosure. Example 400 shows a network entity 410 (e.g., network node 110) that may communicate with a UE 420 (e.g., UE 120), and a network entity 430 (e.g., network node 110) that may communicate with another UE 440 (e.g., UE 120).

A network may have antennas that are grouped together at a transmitter or receiver, in order to increase throughput. The grouping of antennas may be referred to as "massive MIMO." Massive MIMO may use active antenna units (AAUs) to achieve high beamforming gain. An AAU may combine an antenna, a radio, a tower-mounted amplifier, a feeder, and/or jumper functionalities into a single unit. An AAU may include an individual radio frequency (RF) chain for each antenna port.

There may be barriers to massive MIMO. The transmission of signals may be blocked by buildings, natural topography, or other blocking structures. For example, network entity 410 may transmit signals to UE 420, but network entity 410 may not be able to transmit signals to UE 440. As shown in example 400, there is some type of blockage between network entity 410 and UE 440. UE 440 may instead be served by network entity 430.

In order to resolve transmission issues due to the blockage, the network may use a beam reflecting device 450 (e.g., beam reflecting device 160). The beam reflecting device 450 may be a device that forwards, relays, repeats, or reflects signals in a passive or near-passive manner. The beam reflecting device 450 may be configured as a RIS. A RIS may be a two-dimensional surface of engineered material whose properties are reconfigurable rather than static. The engineered material may contain integrated electronic circuits and software that enable the control of a wireless medium by altering an impedance of the surface or a portion of the surface. The change in impedance may alter a phase shift and/or an angle of reflection. Scattering, absorption, reflection, or diffraction properties may be changed with time and controlled by the software. A RIS may act as a reflective lens. In one example, a RIS may include large arrays of inexpensive antennas spaced half of a wavelength apart. In another example, a RIS may include metamaterial-based planar or conformal large surfaces whose elements (e.g., square elements) have sizes and inter-distances that are smaller than the wavelength. Each of the elements may have a configured impedance or other surface properties that are controlled by a voltage to the element. A RIS may also be referred to as a "software-controlled metasurface" or an "intelligent reflecting surface".

The beam reflecting device 450, when configured to operate as a RIS, may not have antennas or RF chains of its own, but may include a large number of small, low-cost elements on a surface to passively reflect incident signals transmitted from network entity 410. A controller of the beam reflecting device 450 may control the elements on the surface, and the surface may act as a phased array. The beam reflecting device 450 may be a smart device that is configured to use a specific angle of reflection for the signals. Network entity 410 may use a controller to control, as part of a reflective configuration, the angle of reflection (angle of arrival $\theta_i$ for an incident wave, angle of departure Or for a reflected wave), an amplitude, a phase, and/or a width of the elements of the beam reflecting device 450 by controlling a voltage to each of the elements. The reflective configuration may also correspond to analog beamforming weights or coefficients that are provided by the beam reflecting device 450 when reflecting signals from one device to another. The reflective configuration may also be referred to as an "RIS reflection configuration," an "RIS reflection matrix," or a "P-MIMO configuration." In sum, the beam reflecting device 450 may help to control a propagation environment with less power consumption than AAUs. Passive devices, such as beam reflecting devices, may even replace AAUs in the propagation environment. MIMO that uses passive devices or beam reflecting devices may be referred to as "passive MIMO" or "P-MIMO". The beam reflecting device 450 may be also referred to as a "passive node" or a "P-MIMO device."

In some aspects, network entity 410 may configure the beam reflecting device 450 by sending a control signal with information for configuring the properties and/or timing of the elements. For example, network entity 410 may transmit a set of beam weights to the beam reflecting device 450 through explicit signaling (e.g., radio resource control (RRC) signaling) instead of using beam sweeping.

In some aspects, the network entity 410 may transmit a control signal to the beam reflecting device 450 for operation of the beam reflecting device 450, and the beam reflecting device 450 may provide information back to the network entity 410. For example, the beam reflecting device 450 may provide a few bits of RIS-side information, such as an indication of an acknowledgement (ACK) or a negative acknowledgment (NACK) of the control signal. The information may also indicate a quality of the channel.

As indicated above, FIG. 4 is provided as an example. Other examples may differ from what is described with regard to FIG. 4.

Figure 5:
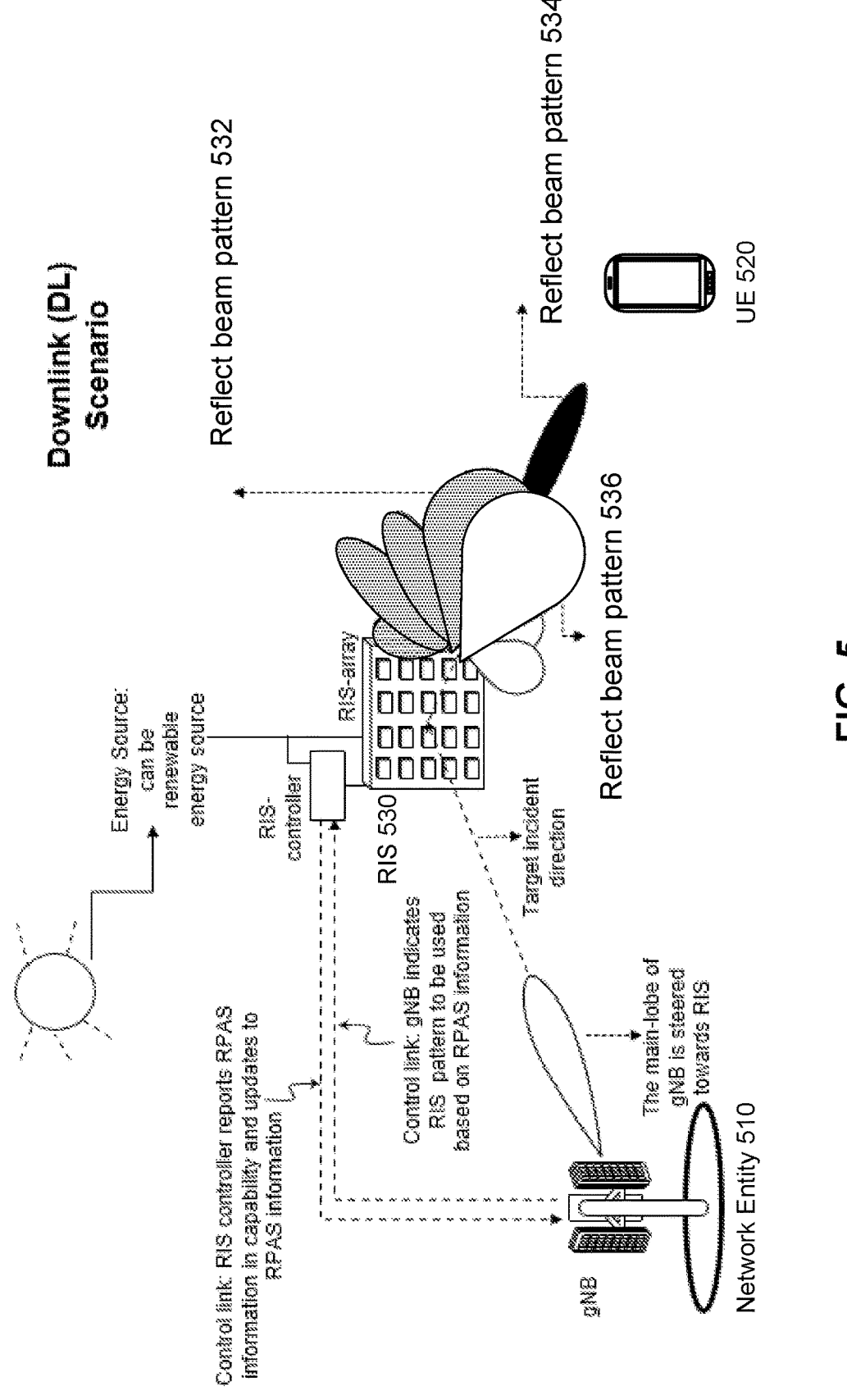
FIG. 5 is a diagram illustrating an example of a reconfigurable intelligent surface, in accordance with the present disclosure.

FIG. 5 is a diagram illustrating an example 500 of a RIS, in accordance with the present disclosure.

A RIS may have an array of passive and reconfigurable reflecting elements that can boost coverage and spectral efficiency at a low deployment cost. The reconfigurability of a RIS my enable a transmitting device, such as a gNB, to realize multiple anomalous reflections, which are reflections that would have altered reflection angles that vary from normal reflection angles (e.g., violate Snell's law). Each reflection may be specified by a target incident direction and a reflected direction. The ability to select multiple anomalous reflections may enable the gNB to have more options and flexibility in UE selection and may enhance the end-to-end channel to the UEs.

Reconfiguring a RIS can involve multi-state tunable electronic components (e.g., PIN diodes, varactors), and the nature of these components determines the quality of a realized reflected beam for a given intended anomalous reflection. The quality can be indicated via attributes such as the gain in a desired direction, a main lobe width, and a maximal side lobe level. Since the tunable components have a frequency dependent response, the quality of each reflected beam varies with the frequency.

According to various aspects described herein, a transmitting device (e.g., a gNB) that controls a beam reflecting device (e.g., a RIS) may receive information from the RIS about a set of reflect beams that the RIS can realize. The transmitting device may become aware of the set of reflect beams without the RIS revealing specific RIS implementations (e.g., PIN-diode based, varactor diode based, with/without per element control). For example, the transmitting device may transmit target reflection angle information that indicates a target reflection angle range for reflect beams. The RIS may select one or more reflect beams based at least in part on the target reflection angle information. The RIS may transmit RPAS information to the transmitting device that indicates the one or more reflect beams (from a target incident direction to a target reflect direction) that are available for use by the transmitting device. The transmitting device may select a beam for a communication from the one or more reflect beams. As a result, beam resources are allocated more efficiently because the transmitting device is informed about the set of realizable RIS reflect beams and associated attributes. This efficiency conserves power, processing resources, and signaling resources.

In some aspects, the RPAS information may indicate reflect beams that account for interfering incident signals (arriving from non-target incident directions). The RPAS information may also include beam reciprocity information. By using different configurations for interfering incident signals and by using the reciprocity information, the transmitting device and the RIS further increase beam selection efficiency and conserve more resources.

Example 500 shows examples of reflect beams that may be selected based at least in part on a target incident direction (direction of main lobe) from a transmitting device, such as network entity 510 (e.g., network node 110, gNB), to a receiving device, such as UE 520 (e.g., UE 120), via a RIS 530 (e.g., beam reflecting device 160). The RIS 530 may harvest energy from a renewable resource, such as the sun. The RIS 530 may provide the RPAS information on a control link.

The network entity 510 may indicate a RIS pattern that the RIS 530 is to use, including reflect beams to use for the target incident direction. Example 500 shows a reflect beam pattern 532 for a first reflect beam, a reflect beam pattern 534 for a second reflect beam, and a reflect beam pattern 536 for a third reflect beam. Each reflect beam pattern may have a distinct main lobe pointing direction and beamwidth. Each reflect beam pattern may have distinct prominent side lobes as well as distinct side lobe levels. Due to beam squint and a frequency dependent response of constituent components, each reflect beam pattern may change across frequency.

The type of RIS implementation may determine a peak gain and a side lobe profile, including a maximal side lobe level. For example, main lobes in a desired reflect direction (e.g., reflect beam pattern 534) may have an unconstrained phase and an 8-ary RIS may have almost the same peak gain, with a Q-RIS peak of about 1 decibel (dB) lower (where Q-RIS is quaternary RIS in which each RIS element can be configured into one of 4 states)) and a B-RIS (where B-RIS is binary RIS in which each RIS element can be configured into one of 2 states) peak of about 4 dB lower. Another reflect beam pattern (e.g., corresponding to 8-RIS and 3-bits per element, beam reflect pattern 536) may have a higher cost of implementation and improved side lobe suppression. Yet another reflect beam pattern (e.g., beam reflect pattern 532) may correspond to an unconstrained phase alphabet RIS and may have the highest cost implementation and improved side lobe suppression. Some reflect beams may have a low-cost implementation with a severe quantization lobe (e.g., B-RIS with 1-bit per-element control) or a low cost implementation with a high side lobe (e.g., Q-RIS with 2-bits per-element control).

As indicated above, FIG. 5 is provided as an example. Other examples may differ from what is described with regard to FIG. 5.

Figure 6:
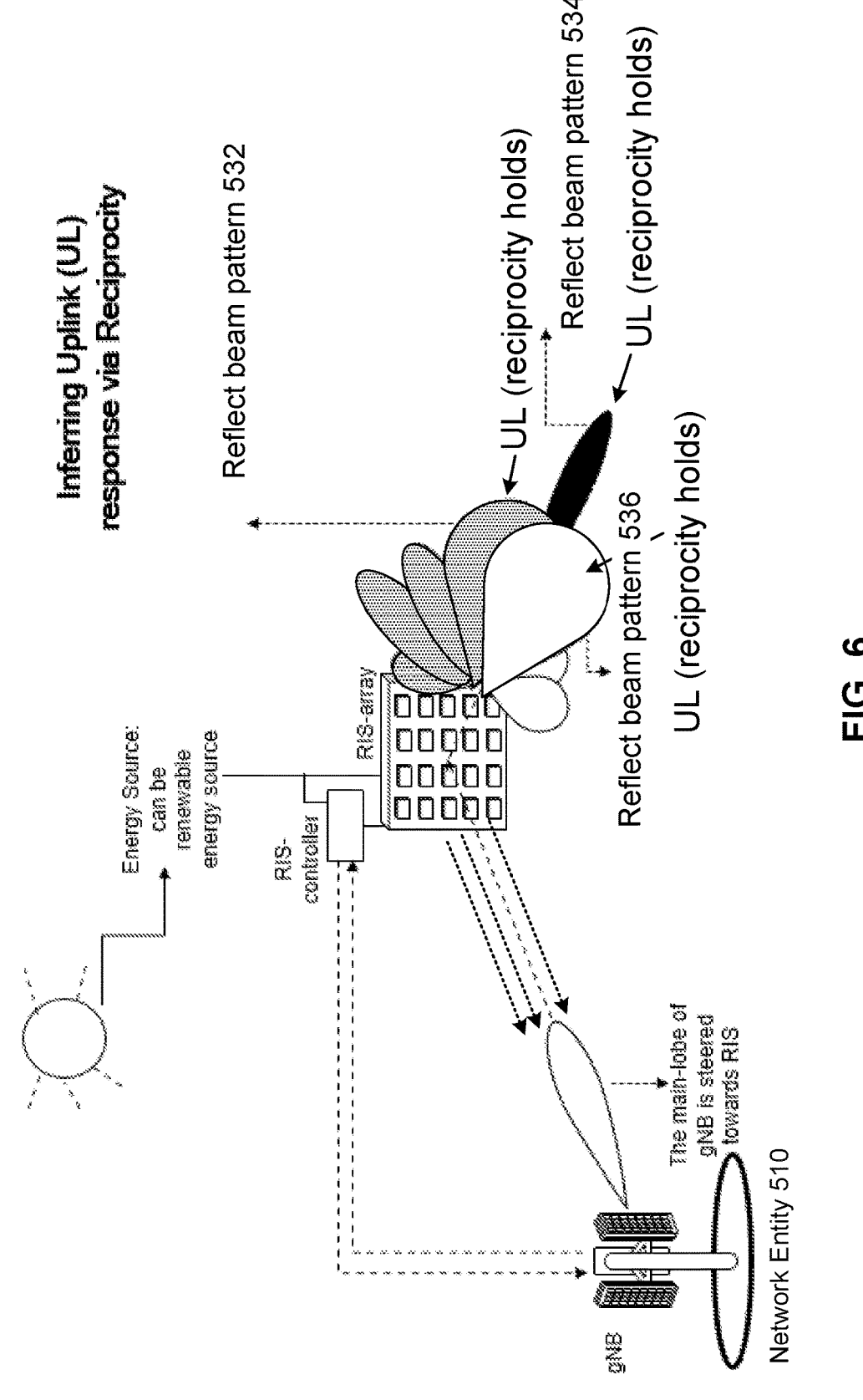
FIG. 6 is a diagram illustrating an example of beam reciprocity, in accordance with the present disclosure.

FIG. 6 is a diagram illustrating an example 600 of beam reciprocity, in accordance with the present disclosure.

The RIS may infer reflect beams in the uplink direction via reciprocity. Reciprocity may include using an opposite direction as a downlink reflect beam for uplink. For example, a reflect beam angle of a downlink transmission may be a target incident direction of an uplink transmission.

Example 600 shows that reciprocity holds (i.e., may be used) for the reflect beam patterns. Each reflect beam pattern may have a distinct main lobe pointing direction, a beamwidth, and distinct prominent side lobes. At a given frequency, reciprocity can hold under a subset of RIS patterns (beams). Furthermore, for each such beam, reciprocity can hold for the main lobe and a subset of its prominent side lobes. When reciprocity holds, a signal transmitted in the uplink direction along any such main lobe and side lobe direction is received at the network entity 510 (along a downlink incident direction) with the same gain as in the corresponding downlink direction.

As indicated above, FIG. 6 is provided as an example. Other examples may differ from what is described with regard to FIG. 6.

Figure 7:
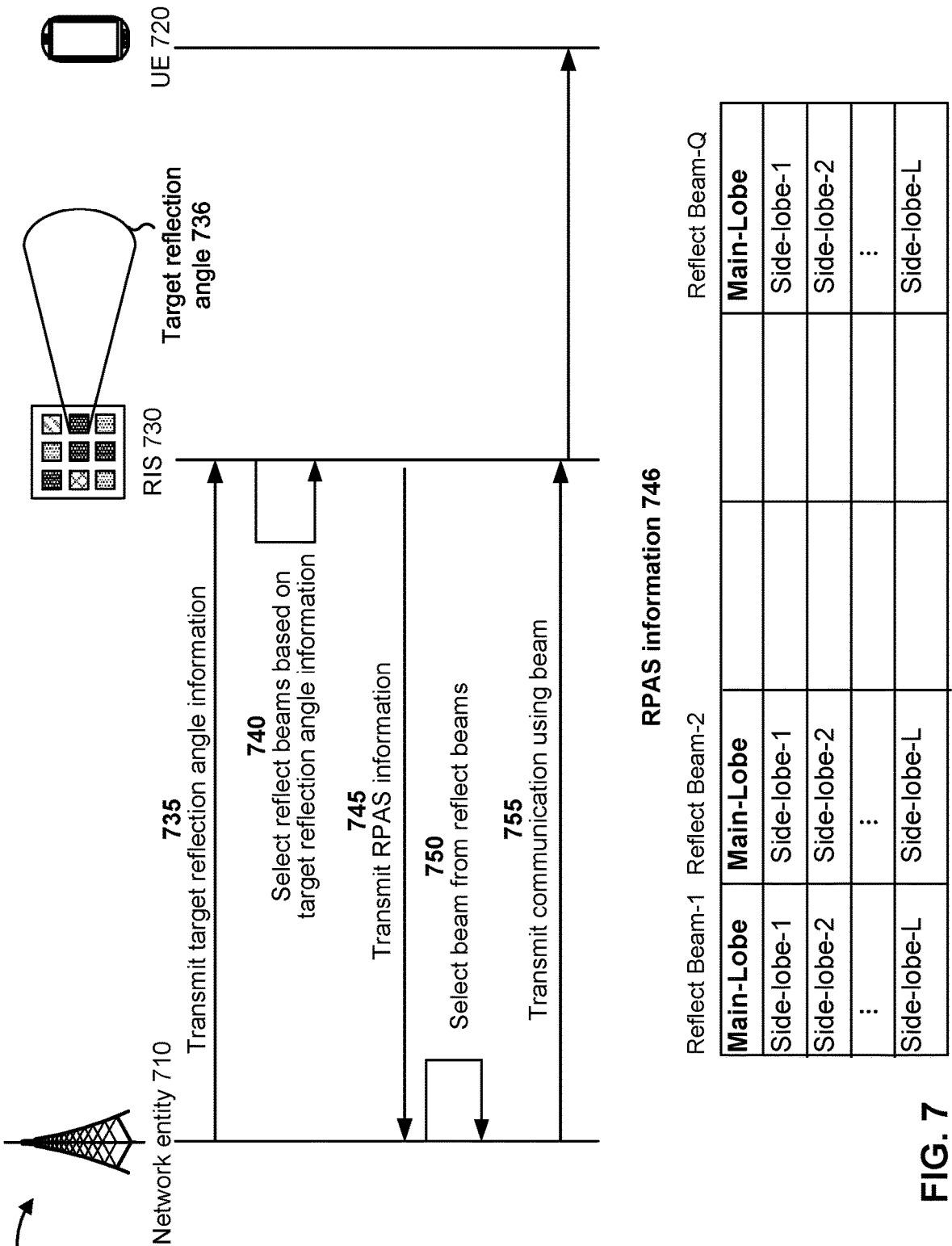
FIG. 7 is a diagram illustrating an example of using reflected power angle spectrum information for beam selection, in accordance with the present disclosure.

FIG. 7 is a diagram illustrating an example 700 of using RPAS information for beam selection, in accordance with the present disclosure. A network entity 710 (e.g., network node 110) may communicate with a UE 720 (e.g., UE 120) by reflecting signals off of a beam reflecting device (e.g., beam reflecting device 730), such as a RIS 730.

Example 700 shows an example of selecting a beam from reflect beams in primary RPAS information, or RPAS information about signals in the target direction. The network entity 710 may control the RIS 730 and provide inputs to the RIS 730 and to other network entities. As shown by reference number 735, the network entity 710 may transmit target reflection angle information to the RIS 730. The target reflection angle information may include an incident signal direction from the network entity 710 to the RIS 730 and/or a distance between the network entity 710 and the RIS 730. The target reflection angle information may indicate a target reflection angle range 736 for reflect beams that the network entity 710 is expected to use or prefers to use. The target reflection angle range 736 may be an angle range between a first target reflection angle and a second target reflection angle. The target reflection angle may be set to capture covered UEs and may account for a capability of the RIS 730. The target reflection angle information may include a set of preferred reflection angles. The target reflection information may include a distance range for each reflection angle in the set indicative of expected UE distances along the reflection angle. The target reflection angle information may include the quantity of requested reflect beams.

As shown by reference number 740, the RIS 730 may select one or more reflect beams based at least in part on the target reflection angle information. The one or more reflect beams may be beams with reflect directions within the target reflection angle range and/or may be at preferred angles. The one or more reflect beams may be designed to focus reflected energy at distances within the distance ranges included for those preferred angles. The one or more reflect beams may be based at least in part on a capability of the components of the RIS 730. The quantity of the one or more reflect beams may be equal to the quantity of requested reflect beams. Each reflect beam of the one or more reflect beams may be associated with one or more attributes for a main lobe of the reflect beam. The attributes may include a beam direction, a peak gain, a beam focusing distance or a threshold and a range of beam focusing distances for which respective gains are within the threshold from the peak gain, a reciprocity indication (identifying whether reciprocity holds for an uplink direction based on a downlink direction), and/or a beam width. Each reflect beam of the one or more reflect beams may be associated with one or more attributes for one or more side lobes of the reflect beam. Attributes may be provided as an index of another reflect beam (from which a relative pointing direction can be inferred) and/or as a difference from a reference main lobe peak gain that is indicative of a side lobe suppression level. In some aspects, the RIS 730 may select the one or more reflect beams based at least in part on an available power budget and/or a performance status (e.g., processing ability, memory available) of the RIS 730.

The one or more reflect beams may be included in RPAS information 746, which may include a table of reflect beams that are configured to provide an anomalous reflection from the input incident direction to the reflect direction. The table may identify attributes for the main lobe and attributes of one or more side lobes of each reflect beam. In some aspects, adjacent columns of the table may correspond to reflect beams with pointing directions whose angular separation is below a predetermined threshold.

In some aspects, the table may identify reflect beams per frequency subband or per polarization (e.g., vertical, horizontal). For a given RIS configuration, the reflected power pattern may be frequency dependent (accentuated by the fact that a response of constituent RIS tunable electronic components can be frequency dependent). The RPAS information may include a separate table per frequency subband and/or per polarization (e.g., in each frequency subband). As shown by reference number 745, the RIS 730 may transmit the RPAS information to the network entity 710. In some aspects, another network entity may provide RPAS information to the network entity 710.

As shown by reference number 750, the network entity 710 may select a beam from the one or more reflect beams in the RPAS information. After selecting the beam, the network entity 710 may indicate a set of beam indices and RPAS table identifiers (along with respective time durations) to the RIS 730 (e.g., the RIS controller of the RIS 730). The network entity 710 may indicate a time domain pattern or schedule for using reflect beams, based at least in part on the RPAS information transmitted to the RIS 730. In some aspects, the network entity 710 may indicate a time domain pattern or schedule such that each beam in the set maps to a separate UE scheduled (on possibly different subbands) across adjacent slots for an indicated duration. As shown by reference number 755, the network entity 710 may transmit a communication using the selected beam. While the network entity 710 is shown as a transmitting device in example 700, a UE may also be a transmitting device.

In some aspects, the network entity 710 may determine a set of reflect beams that can be used for synchronization signal block (SSB) transmission via the RIS 730. The network entity 710 may determine the set of reflect beams for SSBs based at least on attributes that are reported for the reflect beams in the RPAS information and/or an intended service area to be covered via RIS assistance (e.g., RIS-1 assistance). The network entity 710 may select beams for SSB transmission via the RIS 730. A UE (e.g., UE 720) that reports a preferred SSB from this subset may be classified by the network entity 710 as a UE that is to be covered (i.e., served) via RIS assistance. The UE 720 may select a beam for SSB transmission.

As indicated above, FIG. 7 is provided as an example. Other examples may differ from what is described with regard to FIG. 7.

Figure 8A:
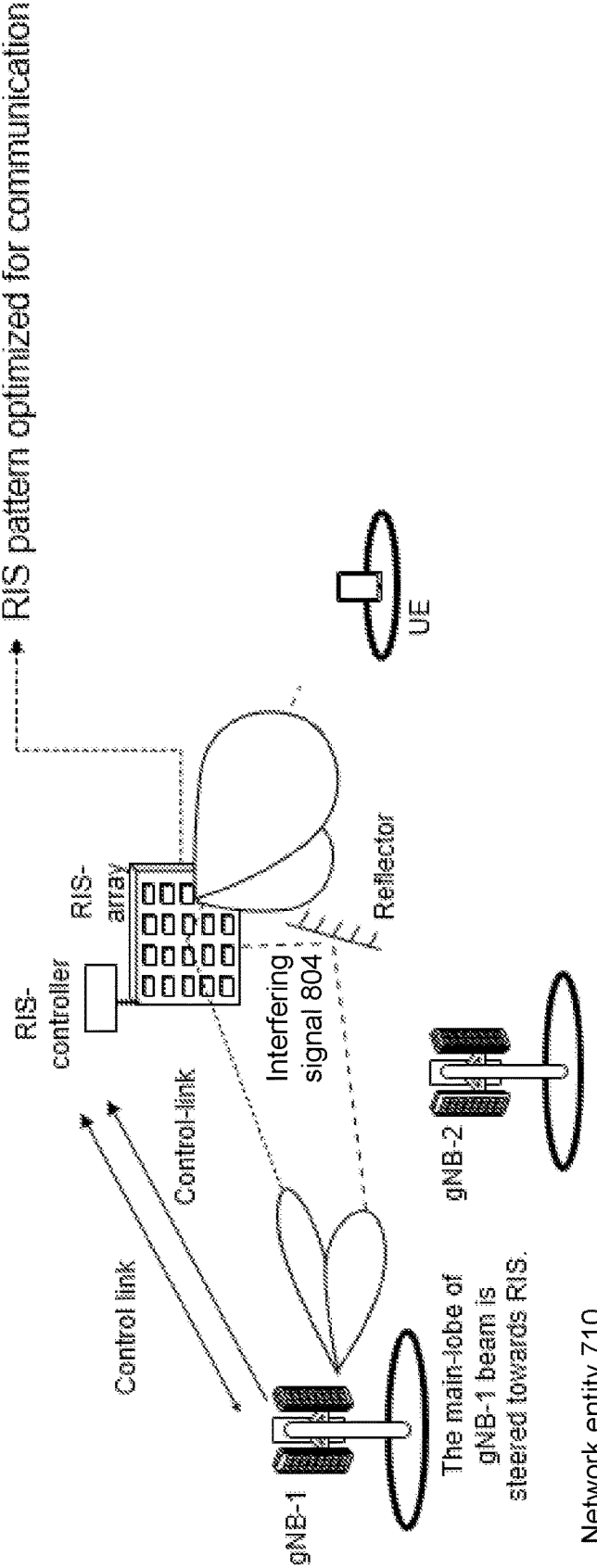
FIGS. 8A and 8B are diagrams illustrating examples of interfering signals, in accordance with the present disclosure.
Figure 8B:
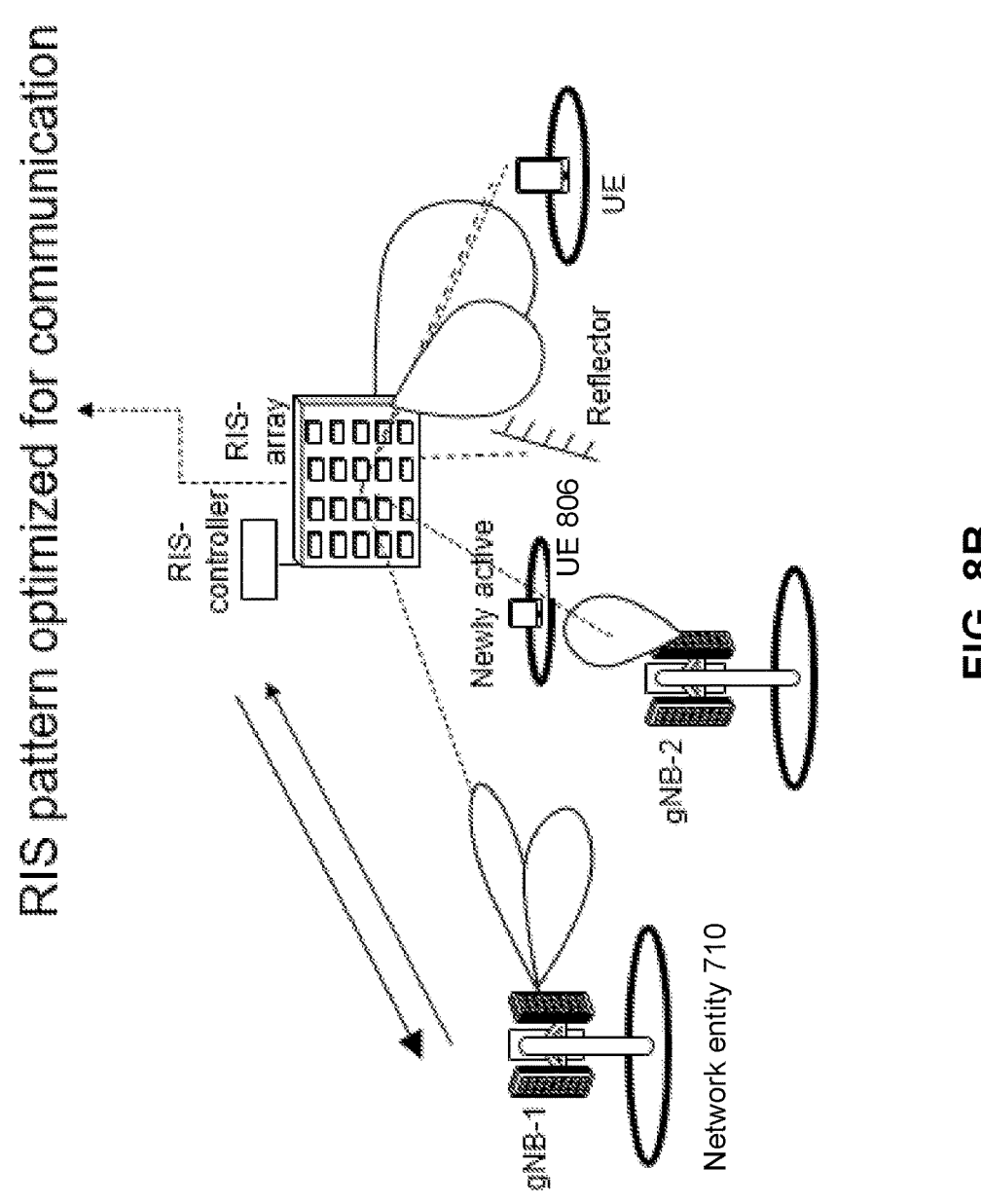

FIGS. 8A and 8B are diagrams illustrating examples 800 and 802 of interfering signals, in accordance with the present disclosure.

In some scenarios, a signal reflected by the RIS 730 may be affected by other signals that are coming from incident interfering signal directions. The interfering signals may be coming from other parts of the RIS 730 itself or from other network entities. Example 800 in FIG. 8A shows an interfering signal 804 that is reaching the RIS 730 from another reflected surface and that affects the reflection of signals by the RIS. Example 802 in FIG. 8B shows an interfering signal intended for a newly active UE 806.

In some aspects, the RIS 730 may provide the network entity 710 with secondary RPAS information about how the RIS 730 reflects signals that are interfering signals incident on the RIS 730. The interfering incident signal information may indicate incident interfering signal directions and distances between the interfering network entities and the RIS 730. The secondary RPAS information may reduce the set of reflect beams indicated in the primary RPAS information or provide information for each of the reflect beams in the primary RPAS information. The secondary RPAS information may provide an updated set of reflect beams. In some aspects, the RIS 730 may select reflect beams for the primary RPAS information based at least in part on the incident signal information. The RIS 730 may provide the secondary RPAS information on a per subband and/or a per polarization basis.

In some aspects, to determine the impact on the RIS 730 due to its reflecting transmissions from other network entities, the network entity 710 (e.g., gNB-1) may determine, under a current RIS pattern configuration, which directions are significantly impacted by the RIS reflection of incident interfering signal from another network entity (e.g., gNB-2). The network entity 710 may determine, under an alternate RIS pattern configuration (at least those which are acceptable to serve a UE), which directions are significantly impacted by the RIS reflection of incident interfering signals from gNB-2.

The secondary RPAS information may consider an interfering incident signal and a column of its secondary RPAS table corresponding to a reflect beam (e.g., reflect-beam-q). Entries under this column may be given for the operation when the RIS 730 is configured under a pattern corresponding to reflect-beam-q. Reflect-beam-q may be one of the RIS configurations in the table of the primary RPAS information. The secondary information may include a side-lobe-m for a reflect beam that corresponds to the mth strongest lobe observed when the RIS 730 is illuminated with the interfering incident signal. Side lobe attributes may include a side-lobe peak gain, a reciprocity indication, a pointing direction, and/or a beam width. These attributes may be provided (in part) as an index of another reflect beam in the primary RPAS table (from which a relative pointing direction can be inferred), along with a difference between a reference main lobe peak gain that is indicative of a side lobe suppression level.

In some aspects, the RIS 730 may provide an update of the primary RPAS information or the secondary RPAS information based at least in part on a change in an available power budget for the beam reflecting device or a performance status of the beam reflecting device. For example, the available power budget of the RIS 730 may preclude the RIS 730 from forming certain reflect beams (e.g., deploying some configurations) that were indicated in its original primary RPAS information. Changes to the available power budget may also affect the secondary RPAS information. That is, some reported reflect beams and the associated information in the columns of the RPAS tables may be no longer valid. The RIS 730 may determine which reflect beams are no longer valid, reflect beams that are added, or changes to attributes for one or more reflect beams. The RIS 730 may transmit an update to the RPAS information at the network entity 710. The update may indicate which reflect beams are no longer valid, reflect beams that are added, and/or changes to attributes for one or more reflect beams. In some aspects, the RIS 730 may provide an update based at least in part on a determination that some of its constituent electronic components have failed, as component failure can be common with low-cost implementations. By providing updated RPAS information, the network entity 710 (or other transmitting device) may effectively use the RIS 730 and improve communications with better beam selection. Improved communications conserve power, processing resources, and signaling resources.

As indicated above, FIGS. 8A and 8B provide some examples. Other examples may differ from what is described with regard to FIGS. 8A and 8B.

Figure 9:
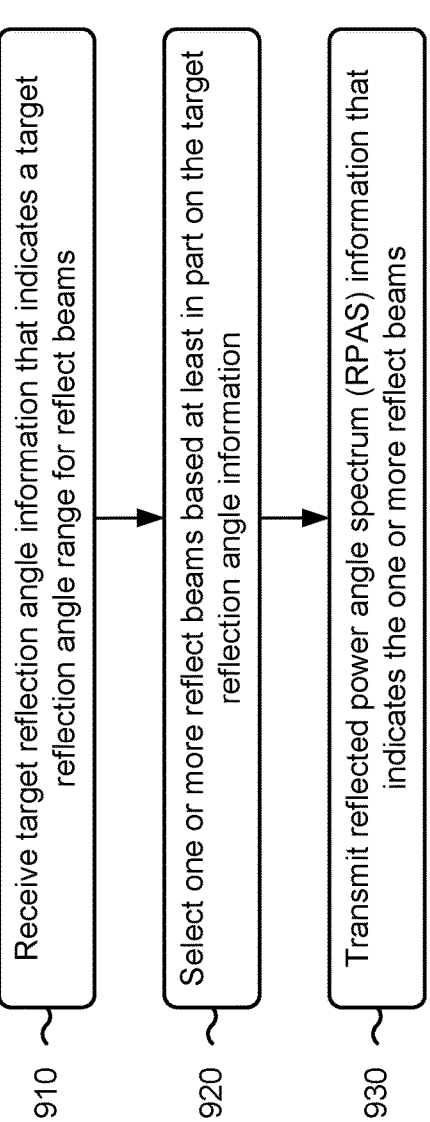
FIG. 9 is a diagram illustrating an example process performed, for example, by a beam reflecting device, in accordance with the present disclosure.

FIG. 9 is a diagram illustrating an example process 900 performed, for example, by a beam reflecting device, in accordance with the present disclosure. Example process 900 is an example where the beam reflecting device (e.g., beam reflecting device 160, RIS 730) performs operations associated with reflect beam selection for power angle spectrum.

As shown in FIG. 9, in some aspects, process 900 may include receiving target reflection angle information that indicates a target reflection angle range for reflect beams (block 910). For example, the beam reflecting device (e.g., using reception component 1102 and/or communication manager 1106 depicted in FIG. 11) may receive target reflection angle information that indicates a target reflection angle range for reflect beams, as described above.

As further shown in FIG. 9, in some aspects, process 900 may include selecting one or more reflect beams based at least in part on the target reflection angle information (block 920). For example, the beam reflecting device (e.g., using communication manager 1106 depicted in FIG. 11) may select one or more reflect beams based at least in part on the target reflection angle information, as described above.

As further shown in FIG. 9, in some aspects, process 900 may include transmitting RPAS information that indicates the one or more reflect beams (block 930). For example, the beam reflecting device (e.g., using transmission component 1104 and/or communication manager 1106 depicted in FIG. 11) may transmit RPAS information that indicates the one or more reflect beams, as described above.

Process 900 may include additional aspects, such as any single aspect or any combination of aspects described below and/or in connection with one or more other processes described elsewhere herein.

In a first aspect, the beam reflecting device is a RIS.

In a second aspect, alone or in combination with the first aspect, the target reflection angle information indicates one or more preferred reflection angles for reflect beams.

In a third aspect, alone or in combination with one or more of the first and second aspects, each reflect beam of the one or more reflect beams is associated with one or more attributes for a main lobe of the reflect beam.

In a fourth aspect, alone or in combination with one or more of the first through third aspects, the one or more attributes include one or more of a beam direction, a beam focusing distance, a peak gain, or a beam width.

In a fifth aspect, alone or in combination with one or more of the first through fourth aspects, each reflect beam of the one or more reflect beams is associated with one or more attributes for one or more side lobes of the reflect beam.

In a sixth aspect, alone or in combination with one or more of the first through fifth aspects, the RPAS information includes reciprocity information for lobes of the one or more reflect beams.

In a seventh aspect, alone or in combination with one or more of the first through sixth aspects, the RPAS information indicates reflect beams per frequency subband.

In an eighth aspect, alone or in combination with one or more of the first through seventh aspects, the RPAS information indicates reflect beams per polarization.

In a ninth aspect, alone or in combination with one or more of the first through eighth aspects, the RPAS information indicates a set of reflect beam indices and RPAS table identifiers. Process 900 may include receiving a time domain pattern or schedule for using reflect beams that is based at least in part on the RPAS information.

In a tenth aspect, alone or in combination with one or more of the first through ninth aspects, selecting the one or more reflect beams includes selecting the one or more reflect beams further based at least in part on one or more of an available power budget for the beam reflecting device or a performance status of the beam reflecting device.

In an eleventh aspect, alone or in combination with one or more of the first through tenth aspects, process 900 includes transmitting an update for the RPAS information based at least in part on a change in an available power budget for the beam reflecting device or a change in a performance status of the beam reflecting device.

In a twelfth aspect, alone or in combination with one or more of the first through eleventh aspects, process 900 includes transmitting secondary information that indicates how reflect beams are affected by interfering signals.

In a thirteenth aspect, alone or in combination with one or more of the first through twelfth aspects, selecting the one or more reflect beams includes selecting the one or more reflect beams further based at least in part on the secondary information.

In a fourteenth aspect, alone or in combination with one or more of the first through thirteenth aspects, the secondary information includes information for reflect beams per subband or per polarization.

In a fifteenth aspect, alone or in combination with one or more of the first through fourteenth aspects, process 900 includes transmitting an update for the secondary information based at least in part on a change in an available power budget for the beam reflecting device or a performance status of the beam reflecting device.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a transmitting device, in accordance with the present disclosure. Example process 1000 is an example where the transmitting device (e.g., network node 110, UE 120, network entity 710) performs operations associated with reflect beam selection for a power angle spectrum.

As shown in FIG. 10, in some aspects, process 1000 may include transmitting target reflection angle information that indicates a target reflection angle range for reflect beams from a beam reflecting device (block 1010). For example, the transmitting device (e.g., using transmission component 1204 and/or communication manager 1206 depicted in FIG. 12) may transmit target reflection angle information that indicates a target reflection angle range for reflect beams from a beam reflecting device, as described above. The target reflection angle information may indicate a target focusing distance for reflect beams from a beam reflecting device, as described above.

As further shown in FIG. 10, in some aspects, process 1000 may include receiving RPAS information that indicates one or more reflect beams selected by the beam reflecting device (block 1020). For example, the transmitting device (e.g., using reception component 1202 and/or communication manager 1206 depicted in FIG. 12) may receive RPAS information that indicates one or more reflect beams selected by the beam reflecting device, as described above.

As further shown in FIG. 10, in some aspects, process 1000 may include selecting, based at least in part on the one or more reflect beams, a beam for communication via the beam reflecting device (block 1030). For example, the transmitting device (e.g., using communication manager 1206 depicted in FIG. 12) may select, based at least in part on the one or more reflect beams, a beam for communication via the beam reflecting device, as described above.

As further shown in FIG. 10, in some aspects, process 1000 may include transmitting a communication using the selected beam (block 1040). For example, the transmitting device (e.g., using transmission component 1204 and/or communication manager 1206 depicted in FIG. 12) may transmit a communication using the selected beam, as described above.

Process 1000 may include additional aspects, such as any single aspect or any combination of aspects described below and/or in connection with one or more other processes described elsewhere herein.

In a first aspect, the target reflection angle information indicates one or more preferred reflection angles for reflect beams. In some aspects, the target reflection angle information indicates one or more focusing distances for the one or more preferred reflection angles. In some aspects, the target reflection angle information indicates a quantity of requested reflect beams.

In a second aspect, alone or in combination with the first aspect, each reflect beam of the one or more reflect beams is associated with one or more attributes for a main lobe of the reflect beam.

In a third aspect, alone or in combination with one or more of the first and second aspects, each reflect beam of the one or more reflect beams is associated with one or more attributes for one or more side lobes of the reflect beam.

In a fourth aspect, alone or in combination with one or more of the first through third aspects, the RPAS information includes reciprocity information for lobes of the one or more reflect beams.

In a fifth aspect, alone or in combination with one or more of the first through fourth aspects, the RPAS information indicates reflect beams per frequency subband.

In a sixth aspect, alone or in combination with one or more of the first through fifth aspects, the RPAS information indicates reflect beams per polarization.

In a seventh aspect, alone or in combination with one or more of the first through sixth aspects, the RPAS information indicates a set of reflect beam indices and RPAS table identifiers that are associated with a time domain pattern or schedule, and process 1000 includes transmitting additional communications using additional reflect beams based at least in part on the time domain pattern or the schedule.

In an eighth aspect, alone or in combination with one or more of the first through seventh aspects, the transmitting device is a network entity.

In a ninth aspect, alone or in combination with one or more of the first through eighth aspects, selecting the beam includes selecting the beam for transmission of an SSB.

In a tenth aspect, alone or in combination with one or more of the first through ninth aspects, the transmitting device is a UE.

In an eleventh aspect, alone or in combination with one or more of the first through tenth aspects, selecting the beam includes selecting the beam for reception of an SSB.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
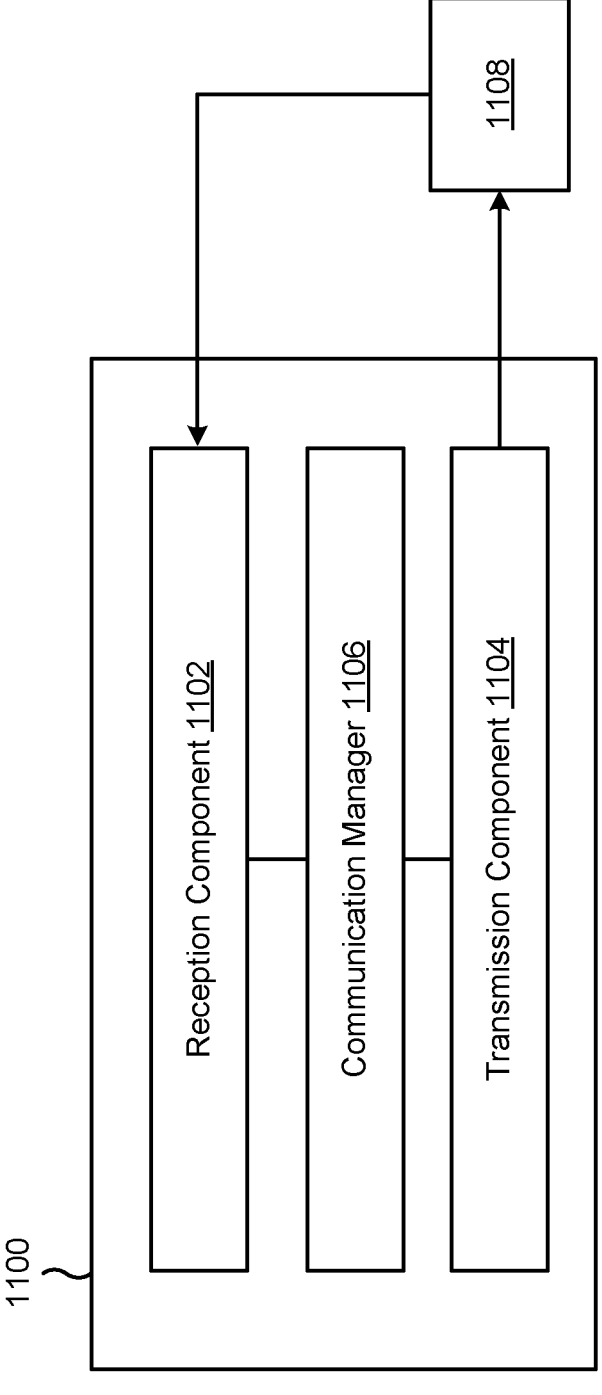
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a beam reflecting device (e.g., beam reflecting device 160), or a beam reflecting device may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 170 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 1-8B. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the beam reflecting device described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the beam reflecting device described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the beam reflecting device described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive target reflection angle information that indicates a target reflection angle range for reflect beams. The communication manager 1106 may select one or more reflect beams based at least in part on the target reflection angle information. The transmission component 1104 may transmit RPAS information that indicates the one or more reflect beams.

The transmission component 1104 may transmit an update for the RPAS information based at least in part on a change in an available power budget for the beam reflecting device or a change in a performance status of the beam reflecting device.

The transmission component 1104 may transmit secondary information that indicates how reflect beams are affected by interfering signals.

The transmission component 1104 may transmit an update for the secondary information based at least in part on a change in an available power budget for the beam reflecting device or a performance status of the beam reflecting device.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
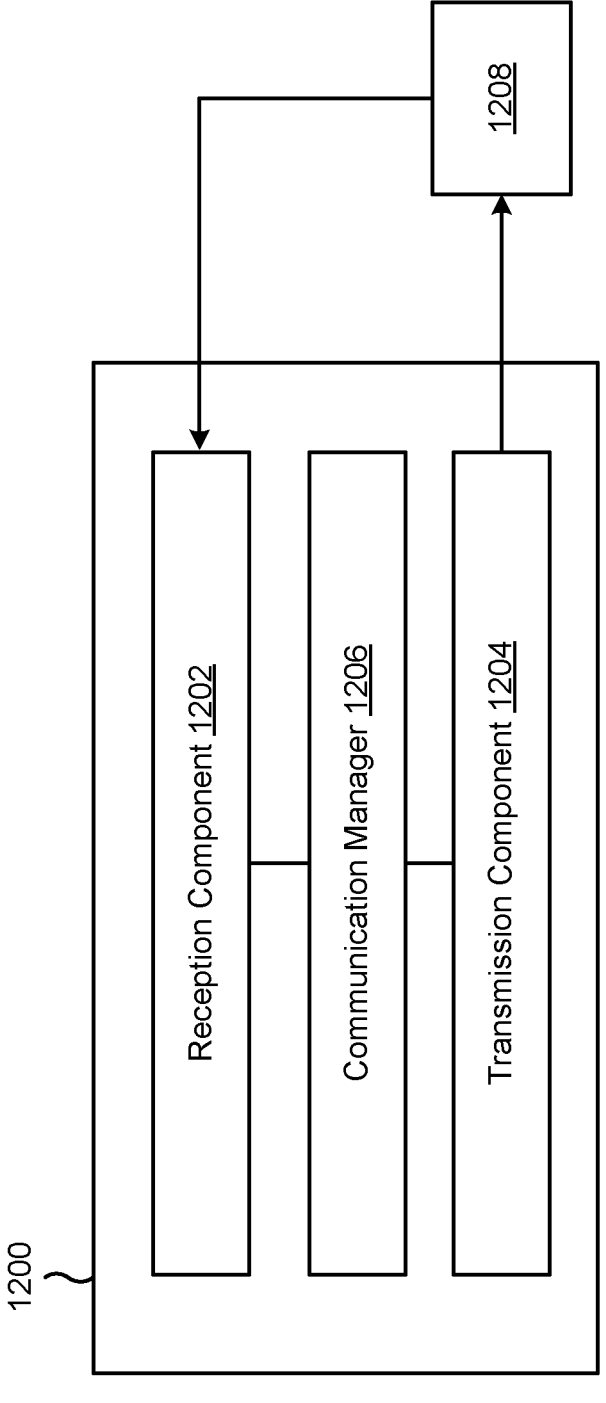
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a transmitting device (e.g., UE 120, network node 110), or a transmitting device may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 or 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 1-8B. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the transmitting device described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the transmitting device described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the transmitting device described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit target reflection angle information that indicates a target reflection angle range for reflect beams from a beam reflecting device. The reception component 1202 may receive RPAS information that indicates one or more reflect beams selected by the beam reflecting device. The communication manager 1206 may select, based at least in part on the one or more reflect beams, a beam for communication via the beam reflecting device. The transmission component 1204 may transmit a communication using the selected beam.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a beam reflecting device, comprising: receiving target reflection angle information that indicates a target reflection angle range for reflect beams; selecting one or more reflect beams based at least in part on the target reflection angle information; and transmitting reflected power angle spectrum (RPAS) information that indicates the one or more reflect beams.

Aspect 2: The method of Aspect 1, wherein the beam reflecting device is a reconfigurable intelligent surface.

Aspect 3: The method of any of Aspects 1-2, wherein the target reflection angle information indicates preferred reflection angles for reflect beams.

Aspect 4: The method of any of Aspects 1-3, wherein the target reflection angle information indicates one or more focusing distances for the one or more preferred reflection angles.

Aspect 5: The method of any of Aspects 1-4, wherein the target reflection angle information indicates a quantity of reflect beams.

Aspect 6: The method of any of Aspects 1-5, wherein each reflect beam of the one or more reflect beams is associated with one or more attributes for a main lobe of the reflect beam.

Aspect 7: The method of Aspect 6, wherein the one or more attributes include one or more of a beam direction, a beam distance, a peak gain, or a beam width.

Aspect 8: The method of any of Aspects 1-7, wherein each reflect beam of the one or more reflect beams is associated with one or more attributes for one or more side lobes of the reflect beam.

Aspect 9: The method of any of Aspects 1-8, wherein the RPAS information includes reciprocity information for lobes of the one or more reflect beams.

Aspect 10: The method of any of Aspects 1-9, wherein the RPAS information indicates reflect beams per frequency subband.

Aspect 11: The method of any of Aspects 1-10, wherein the RPAS information indicates reflect beams per polarization.

Aspect 12: The method of any of Aspects 1-11, wherein the RPAS information indicates a set of reflect beam indices and RPAS table identifiers, and wherein the method includes receiving a time domain pattern or schedule for using reflect beams that is based at least in part on the RPAS information.

Aspect 13: The method of any of Aspects 1-12, wherein selecting the one or more reflect beams includes selecting the one or more reflect beams further based at least in part on one or more of an available power budget for the beam reflecting device or a performance status of the beam reflecting device.

Aspect 14: The method of any of Aspects 1-13, further comprising transmitting an update for the RPAS information based at least in part on a change in an available power budget for the beam reflecting device or a change in a performance status of the beam reflecting device.

Aspect 15: The method of any of Aspects 1-13, further comprising transmitting secondary information that indicates how reflect beams are affected by interfering signals.

Aspect 16: The method of Aspect 14, wherein selecting the one or more reflect beams includes selecting the one or more reflect beams further based at least in part on the secondary information.

Aspect 17: The method of Aspect 15, wherein the secondary information includes information for reflect beams per subband or per polarization.

Aspect 18: The method of Aspect 15, further comprising transmitting an update for the secondary information based at least in part on a change in an available power budget for the beam reflecting device or a performance status of the beam reflecting device.

Aspect 19: A method of wireless communication performed by a transmitting device, comprising: transmitting target reflection angle information that indicates a target reflection angle range for reflect beams from a beam reflecting device; receiving reflected power angle spectrum (RPAS) information that indicates one or more reflect beams selected by the beam reflecting device; selecting, based at least in part on the one or more reflect beams, a beam for communication via the beam reflecting device; and transmitting a communication using the selected beam.

Aspect 20: The method of Aspect 19, wherein the target reflection angle information indicates preferred reflection angles for reflect beams.

Aspect 21: The method of any of Aspects 19-20, wherein each reflect beam of the one or more reflect beams is associated with one or more attributes for a main lobe of the reflect beam.

Aspect 22: The method of any of Aspects 19-21, wherein each reflect beam of the one or more reflect beams is associated with one or more attributes for one or more side lobes of the reflect beam.

Aspect 23: The method of any of Aspects 19-22, wherein the RPAS information includes reciprocity information for lobes of the one or more reflect beams.

Aspect 24: The method of any of Aspects 19-23, wherein the RPAS information indicates reflect beams per frequency subband.

Aspect 25: The method of any of Aspects 19-24, wherein the RPAS information indicates reflect beams per polarization.

Aspect 26: The method of any of Aspects 19-25, wherein the RPAS information indicates a set of reflect beam indices and RPAS table identifiers that are associated with a time domain pattern or schedule, and wherein the method includes transmitting additional communications using additional reflect beams based at least in part on the time domain pattern or the schedule.

Aspect 27: The method of any of Aspects 19-26, wherein the transmitting device is a network entity.

Aspect 28: The method of Aspect 27, wherein selecting the beam includes selecting the beam for transmission of a synchronization signal block.

Aspect 29: The method of any of Aspects 19-26, wherein the transmitting device is a user equipment.

Aspect 30: The method of Aspect 29, wherein selecting the beam includes selecting the beam for reception of a synchronization signal block.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-28.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A beam reflecting device for wireless communication, comprising:
   one or more memories; and
   one or more processors coupled to the one or more memories, the one or more processors individually or collectively configured to:
   receive target reflection angle information that indicates a target reflection angle range for reflect beams;

select one or more reflect beams based at least in part on the target reflection angle information; and
transmit reflected power angle spectrum (RPAS) information that indicates the one or more reflect beams, wherein the RPAS information identifies one or more beam directions and one or more peak gains of the one or more reflect beams.

2. The beam reflecting device of claim 1, wherein the beam reflecting device is a reconfigurable intelligent surface.

3. The beam reflecting device of claim 1, wherein the target reflection angle information indicates one or more preferred reflection angles for reflect beams.

4. The beam reflecting device of claim 3, wherein the target reflection angle information indicates one or more focusing distances for the one or more preferred reflection angles.

5. The beam reflecting device of claim 1, wherein the target reflection angle information indicates a quantity of requested reflect beams.

6. The beam reflecting device of claim 1, wherein each reflect beam of the one or more reflect beams is associated with one or more attributes for a main lobe of the reflect beam.

7. The beam reflecting device of claim 6, wherein the one or more attributes include one or more of a beam direction, a beam focusing distance, a peak gain, or a beam width.

8. The beam reflecting device of claim 1, wherein each reflect beam of the one or more reflect beams is associated with one or more attributes for one or more side lobes of the reflect beam.

9. The beam reflecting device of claim 1, wherein the RPAS information includes reciprocity information for lobes of the one or more reflect beams.

10. The beam reflecting device of claim 1, wherein the RPAS information indicates reflect beams per frequency subband.

11. The beam reflecting device of claim 1, wherein the RPAS information indicates reflect beams per polarization.

12. The beam reflecting device of claim 1, wherein the RPAS information indicates a set of reflect beam indices and RPAS table identifiers, and wherein the one or more processors are configured to receive a time domain pattern or schedule for using reflect beams that is based at least in part on the RPAS information.

13. The beam reflecting device of claim 1, wherein the one or more processors, to select the one or more reflect beams, are configured to select the one or more reflect beams further based at least in part on one or more of an available power budget for the beam reflecting device or a performance status of the beam reflecting device.

14. The beam reflecting device of claim 1, wherein the one or more processors are configured to transmit an update for the RPAS information based at least in part on a change in an available power budget for the beam reflecting device or a change in a performance status of the beam reflecting device.

15. The beam reflecting device of claim 1, wherein the one or more processors are configured to transmit secondary information that indicates how reflect beams are affected by interfering signals.

16. The beam reflecting device of claim 15, wherein the one or more processors, to select the one or more reflect beams, are configured to select the one or more reflect beams further based at least in part on the secondary information.

17. The beam reflecting device of claim 15, wherein the secondary information includes information for reflect beams per subband or per polarization.

18. The beam reflecting device of claim 15, wherein the one or more processors are configured to transmit an update for the secondary information based at least in part on a change in an available power budget for the beam reflecting device or a performance status of the beam reflecting device.

19. A transmitting device for wireless communication, comprising:
one or more memories; and
one or more processors coupled to the one or more memories, the one or more processors individually or collectively configured to:
transmit target reflection angle information that indicates a target reflection angle range for reflect beams from a beam reflecting device;
receive reflected power angle spectrum (RPAS) information that indicates one or more reflect beams selected by the beam reflecting device, wherein the RPAS information identifies one or more beam directions and one or more peak gains of the one or more reflect beams;
select, based at least in part on the one or more reflect beams, a beam for communication via the beam reflecting device; and
transmit a communication using the selected beam.

20. The transmitting device of claim 19, wherein the target reflection angle information indicates one or more of a quantity of requested reflect beams, one or more preferred reflection angles for reflect beams, or one or more focusing distances for the one or more preferred reflection angles.

21. The transmitting device of claim 19, wherein each reflect beam of the one or more reflect beams is associated with one or more attributes for a main lobe of the reflect beam.

22. The transmitting device of claim 19, wherein each reflect beam of the one or more reflect beams is associated with one or more attributes for one or more side lobes of the reflect beam.

23. The transmitting device of claim 19, wherein the RPAS information indicates one or more of reciprocity information for lobes of the one or more reflect beams, reflect beams per frequency subband, or reflect beams per polarization.

24. The transmitting device of claim 19, wherein the RPAS information indicates a set of reflect beam indices and RPAS table identifiers that are associated with a time domain pattern or schedule, and wherein the one or more processors are configured to transmit additional communications using additional reflect beams based at least in part on the time domain pattern or the schedule.

25. The transmitting device of claim 19, wherein the transmitting device is a network entity.

26. The transmitting device of claim 25, wherein the one or more processors, to select the beam, are configured to select the beam for transmission of a synchronization signal block.

27. The transmitting device of claim 19, wherein the transmitting device is a user equipment.

28. The transmitting device of claim 27, wherein the one or more processors, to select the beam, are configured to select the beam for reception of a synchronization signal block.

29. A method of wireless communication performed by a beam reflecting device, comprising:

receiving target reflection angle information that indicates a target reflection angle range for reflect beams;

selecting one or more reflect beams based at least in part on the target reflection angle information; and transmitting reflected power angle spectrum (RPAS) information that indicates the one or more reflect beams, wherein the RPAS information identifies one or more beam directions and one or more peak gains of the one or more reflect beams.

30. A method of wireless communication performed by a transmitting device, comprising:

transmitting target reflection angle information that indicates a target reflection angle range for reflect beams from a beam reflecting device;

receiving reflected power angle spectrum (RPAS) information that indicates one or more reflect beams selected by the beam reflecting device, wherein the RPAS information identifies one or more beam directions and one or more peak gains of the one or more reflect beams;

selecting, based at least in part on the one or more reflect beams, a beam for communication via the beam reflecting device; and transmitting a communication using the selected beam.

* * * * *